Aug. 14, 1934.                H. R. GIBBONS ET AL                1,970,449
                               ANTIFRICTION BEARING
                               Filed Nov. 28, 1931

INVENTORS:
HAROLD R. GIBBONS,
OTTO W. YOUNG,
BY
            THEIR ATTORNEY.

Patented Aug. 14, 1934

1,970,449

UNITED STATES PATENT OFFICE 1,970,449

ANTIFRICTION BEARING

Harold R. Gibbons, Chatham, and Otto W. Young, East Orange, N. J., assignors to General Motors Corporation, Detroit, Mich., a corporation of Delaware Application November 28, 1931, Serial No. 577,782

4 Claims. (Cl. 308—212)

This invention relates to antifriction bearings and comprises all of the features of novelty herein disclosed. An object of the invention is to provide an improved roller bearing construction. Another object is to provide an improved end ring construction wherein the end ring is easily assembled with one of the race rings and is capable of taking considerable end thrust without distortion and without sacrificing roller length or weakening the race ring. To these ends and also to improve generally upon devices of this character, the invention consists in the various matters hereinafter described and claimed.

In its broader aspects, the invention is not necessarily limited to the specific construction selected for illustration in the accompanying drawing in which Fig. 1 is a cross sectional view taken axially of the bearing.

Figure 1:
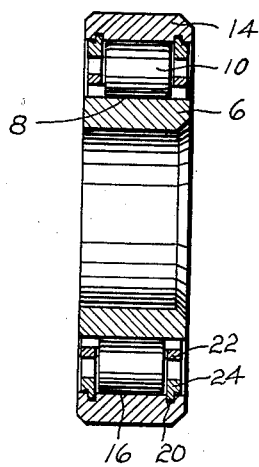
Figure 4:
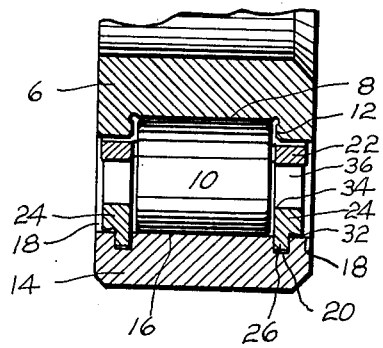
Fig. 4 is a cross sectional view of a portion of a bearing with a shouldered inner race ring.
Figure 3:
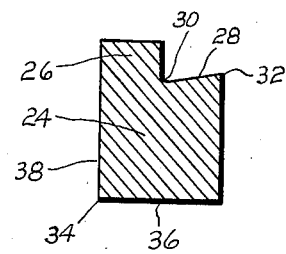
Fig. 3 is an enlarged sectional view on line 3—3 of Fig. 2.

The numeral 6 indicates an inner race ring having the usual chamfered bore to fit over a shaft and having an external raceway surface 8. When the rolling elements 10 are plain cylinders, the raceway surface 8 may be straight and uninterrupted across the bearing as in Fig. 1 or may terminate at end thrust shoulders 12 as indicated in Fig. 4. An outer race ring 14 surrounds the row of rolling elements and is provided with a raceway surface 16 each end of which is separated from a land 18 by a groove 20. To keep the rolling elements properly spaced, a plain cylindrical band 22 is provided, the band having openings conforming to the rollers and lying closer to the inner race ring than to the outer race ring to hold the rollers in the outer race ring when the inner race ring is removed.

To transmit thrust forces to the outer race ring, split end rings 24 of considerable thickness to resist distortion are provided. It is impractical to locate an end ring holding groove very near the edge of the race ring and a wide groove for a ring thick enough to resist distortion would undesirably decrease the space available for rollers. Accordingly the body of the end ring is provided with a reduced extension comprising an outwardly projecting flange 26 adapted to fit the sides of the comparatively narrow groove 20 and to extend nearly to the bottom of the groove. Lateral bending of the ring is resisted by enlarging the body or making a portion of the body taper outwardly at 28 from a very small radius at 30 to a point 32, the latter point bearing against the land 18. The taper is exaggerated some in the drawing for purposes of disclosure but is sufficient to insure contact of the face 28 with the land at a point remote from the groove. This contact prevents any forcible contact between the bottom of the groove 20 and the extension 26 as well as between the land 18 and the body portion in the region of the extension. The only pressure contact between the peripheral surface of the end ring and the race ring is at a location most remote from the bearing surface 16. Thus, end thrust transmitted from the rollers to the adjacent face of the end ring is resisted at a considerable angle which is never less efficient than a resisting force acting along a line from point 32 to a point 34.

Figure 2:
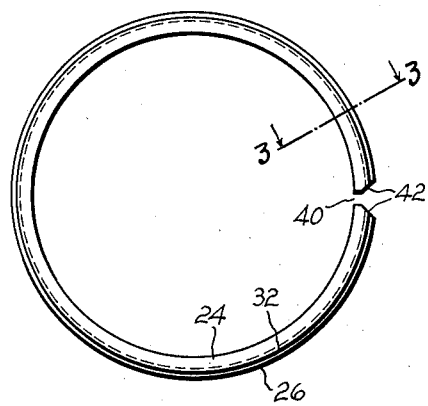
Fig. 2 is a side view of the end ring.
Figure 5:
Fig. 5 is a view of a modified form of end ring joint looking towards the center of the ring.

The end ring preferably has a cylindrical bore 36 which stops well short of the axes of the rollers yet leaves a thrust face 38 next to the roller ends of ample area. When the end ring is unconfined, it takes the position shown in Fig. 2 with an interruption at 40 which is enlarged outwardly by tapered faces at 42. The interruption allows the ring to be contracted to a dimeter which will enable the ring to enter inside the land 18 for the purpose of snapping the flange into the groove. The interruption in the ring is smaller near the inner periphery where the rollers bear and greater at the outer periphery which is in or near the groove so the rollers are guided across the narrow joint. Fig. 5 shows another form of joint wherein the adjacent ends 44 are at an angle to partly overlap.

We claim:

1. In an antifriction bearing, a race member having a bearing surface and a land separated from the bearing surface by a groove, an end ring carried by the race member, the end ring comprising a thickened body portion having a reduced extension entering the groove, the body portion overlying the land and having its peripheral surface making an angle with respect to said land and arranged to approach the land in a direction away from the extension whereby resistance to lateral distortion of the ring cannot occur by contact between such peripheral surface and the land at a point near the groove but is insured by such a contact at a point remote from the groove; substantially as described.

2. In an antifriction bearing, a race member having a bearing surface and a land separated from the bearing surface by a groove, an end ring carried by the race member, the end ring comprising a thickened body portion having a reduced extension entering the groove, the body portion overlying the land and having its peripheral surface making an angle with respect to said land and arranged to approach the land in a direction away from the extension, the end ring being split and resilient, thereby urging the outer terminus of said angled surface into contact with the land, such contact holding the extension from forcible contact with the bottom of the groove and holding said angled surface from forcible contact with the land in the region of the groove; substantially as described.

3. In an antifriction bearing, a race member having a bearing surface, an end ring carried by the race member, and the peripheral surface of the end ring having contact with the race ring only at that portion which is most remote from the bearing surface; substantially as described.

4. In an antifriction bearing, a race member having a bearing surface, an end ring carried by the race member, a peripheral surface of the end ring having pressure contact with the race ring only at that portion of said peripheral surface which is most remote from the middle of the race ring, and the non-contacting portion of the ring periphery having an extension entering a holding groove without engaging the bottom thereof; substantially as described.

HAROLD R. GIBBONS.
OTTO W. YOUNG.